United States Patent [19]
O'Neill

[11] Patent Number: 5,925,969
[45] Date of Patent: Jul. 20, 1999

[54] FERROELECTRIC TRANSDUCERS

[76] Inventor: Cormac G. O'Neill, 2097 Robb Rd., Walnut Creek, Calif. 94596

[21] Appl. No.: 08/733,156

[22] Filed: Oct. 17, 1996

Related U.S. Application Data

[60] Provisional application No. 60/005,672, Oct. 17, 1995.

[51] Int. Cl.⁶ ................................................... H01L 41/08
[52] U.S. Cl. .............................................................. 310/328
[58] Field of Search ...................................... 310/323, 328, 310/366, 317

[56] References Cited

U.S. PATENT DOCUMENTS

| | | | |
|---|---|---|---|
| 4,423,347 | 12/1983 | Kleinschmidt et al. | 310/331 |
| 4,510,412 | 4/1985 | Suda et al. | 310/328 |
| 4,639,630 | 1/1987 | Rodloff et al. | 310/328 |
| 4,769,569 | 9/1988 | Stahlhuth | 310/328 |
| 4,843,293 | 6/1989 | Futami | 318/609 |
| 4,859,896 | 8/1989 | Anders et al. | 310/328 |
| 4,968,914 | 11/1990 | West et al. | 310/328 |
| 4,975,615 | 12/1990 | Katahara | 310/328 |
| 5,004,946 | 4/1991 | Sakaida et al. | 310/328 |
| 5,124,929 | 6/1992 | Arlt | 364/474.09 |
| 5,212,648 | 5/1993 | Sugita et al. | 364/474.35 |
| 5,260,622 | 11/1993 | West | 310/328 |

*Primary Examiner*—Clayton E. LaBalle
*Attorney, Agent, or Firm*—Rankin A. Milliken

[57] ABSTRACT

Ferroelectric transducers each including two cooperating, identically polarized ferroelectric stacks which are excited in opposite polarity. Each transducer includes a yoke assembly for sensing the respective expansions and contractions of the two ferroelectric stacks, mechanically adding these respective expansions and contractions, and applying the sum thereof to a pair of elongated T-levers, which T-levers serve to displace the output element of the transducer.

8 Claims, 9 Drawing Sheets

Fig. 16

FERROELECTRIC TRANSDUCERS

This application claims the benefit of U.S. Provisional application Ser. No. 60/005,672 filed Oct. 17, 1995.

BACKGROUND OF THE INVENTION

1. Field of the Invention

The present invention relates to ferroelectric (FE) transducers, and more particularly to high precision ferroelectric transducers of the kind which are sometimes incorporated into high precision machine tools, such as tools used in the fabrication of aspherical lens molds.

2. Description of the Prior Art

Ferroelectric transducers for use in high precision machine tools are known in the prior art.

However, the ferroelectric transducers of the prior art have not completely satisfied the requirements of high precision machine tool applications.

For example, certain ferroelectric devices of the prior art have not been sufficiently free from temperature effects to satisfy all of the requirements of precision machine tool designers.

In addition, the displacement available from prior art ferroelectric transducers has been insufficient to provide a practical range of displacements for machining.

Further, not all ferroelectric transducers of the prior art have been capable of providing sufficiently fine displacement control, and resolution is particularly important when employing feedback, to eliminate hysteresis.

Yet further, not all ferroelectric transducers of the prior art have been capable of precision operation at sufficiently high cyclic rates to satisfy the requirements of precision machine tool designers.

SUMMARY OF THE INVENTION

Accordingly, it is an object of the present invention to provide ferroelectric transducers having superior properties and characteristics which especially fit them for use in high precision machine tools.

Another object of the present invention is to provide ferroelectric transducers which achieve the above object, and which are compensated against temperature error to a degree not hitherto achieved.

Yet another object of the present invention is to provide ferroelectric transducers which achieve one or more of the above objects, and which are characterized by the fact that the output member movement of these transducers can be controlled to provide displacements of as little as one microinch, and as much as 0.020 inch (0.50 mm.).

A further object of my present invention is to provide ferroelectric transducers which achieve one or more of the above objects, and which can be programmed to follow a displacement sine wave of up to 100 Hertz.

A yet further object of the present invention is to provide ferroelectric transducers which achieve one or more of the above objects, and which provide high tool displacement forces, e.g., as great as six pounds.

Another object of my present invention is to provide ferroelectric transducers which achieve one or more of the above objects, and which include friction-free output devices whereby the control resolution thereof is substantially infinite.

Another object of the present invention is to provide a system which produces high tool displacement, on the order of 500 microns.

Other objects of the present invention will in part be obvious and will in part appear hereinafter.

The present invention, accordingly, comprises the several steps and the relation of one or more such steps with respect to each of the others, and the apparatus embodying features of construction, combinations of elements, and arrangements of parts which are adapted to effect such steps, all as exemplified in the following disclosure.

In accordance with a principal feature of the present invention ferroelectric transducers of the present invention are comprised of two cooperating, identically polarized, ferroelectric stacks which are excited in opposite polarity.

In accordance with another principal feature of the present invention ferroelectric transducers of the present invention include yoke plate means for sensing the expansion of one of said stacks and the contraction of the other one of said stacks, mechanically adding these displacements, and applying the sum of these displacements to a pair of elongated tee-levers which in turn serve to displace the output element of the transducer.

In accordance with yet another principal of the present invention ferroelectric transducers of the invention include tool beams for carrying the tools driven by the transducers of the invention.

In accordance with a further principal feature of the present invention the tool beams of the ferroelectric transducers of the invention are supported by pairs of H-shaped flexure plates, the purpose of which is to insure that the output displacement of the ferroelectric stack is held in a straight line and the tool is held at a constant angle to the workpiece.

For a fuller understanding of the nature and objects of the present invention, reference should be had to the following detailed description, taken in connection with the accompanying drawings.

DESCRIPTION OF THE PREFERRED EMBODIMENT

The ferroelectric transducer of the present invention has very broad application, e.g., in high precision machine tools of the kind used in the machining of aspherical lens molds and the like.

In the precision machining of glass and metal elements such as glass lenses or lens molds it is desirable to achieve very high resolution, e.g., of the order of 50 nanometers. In order to achieve this very high resolution, a ferroelectric transducer of the present invention may be employed. In such an application a ferroelectric transducer of the present invention, having a very high resolution capability and a very fast response characteristic may be incorporated into a precision tool component of the kind sometimes called a "tool servo tractor". Such a tool servo tractor should be capable of performing two full cycles of displacement per revolution of the workpiece chuck when the workpiece chuck is rotating at 5000 rpm. This ferroelectric transducer should also respond to a feedback control system which compares the tool displacement actually achieved with a 167 Hz output command to generate a correction signal by means of which to hold the actual displacement in very precise correspondence with the displacement commanded in accordance with a stored pattern. The feedback transducer may be a linear variable differential transformer (LVDT) or a fiber optic sensor such as manufactured by MTI and other companies. This feedback transducer should have a response rate of no less than 1 kHz, and preferably 10 Khz.

The tool carring element (tool beam) of the servo tractor of the present invention is driven by a pair of FE stacks comprised of flat ferroelectric elements. The ferroelectric material of these elements is a ceramic material the molecular structure of which acts ferroelectrically when subjected to an electric field, i.e., develops a mechanical strain. The resulting elongation of one stack and the contraction or shortening of the other stack is amplified by a lever system and coupled to the tool beam. This tool beam carries the machining tool. The tool beam is mechanically coupled to a feedback transducer which provides an electrical feedback signal to the electrical circuit used to excite the stacks.

In a ferroelectric transducer of the present invention the respective stacks of ferroelectric plates are electrically excited in opposite polarity and thus one stack elongates when the other stack shrinks or contracts. Each stack terminates at both ends in a rigid steel shoeplate which is bonded to the remainder of the stack by means of a bonding agent such as epoxy cement.

A substantially horizontal tiltable plate (yoke) is supported by two rollers, each of which rollers bears upon the upper shoe plate of one of the FE stacks. Thus, this yoke tilts when the stacks are differentially excited and is substantially horizontal when the stacks are unexcited.

In the first preferred embodiment of the present invention the periphery of each ferroelectric plate takes the form of the periphery of a circle from which three minor segments have been removed.

As will be evident to those having ordinary skill in the art, informed by the present disclosure, the yoke tilts in a first direction or a second direction depending upon the polarity of the excitation applied to the two coacting FE stacks.

Two levers (called "T-levers") each of which is a metal plate taking the form of a truncated equilateral triangle, are affixed to opposed edges of the yoke. The two ferroelectric stacks are disposed between the T-levers, each T-lever terminating below the supporting plate upon which the FE stacks are mounted.

The rollers which bear upon the upper shoe plates of the respective stacks and are received in suitable triangular cross-section grooves in the bottom of the yoke are preferably fabricated from tungsten carbide.

An adjustable depresser exerts downward force on the top of the yoke and thus presses said rollers against the upper shoeplates of their respective associated ferroelectric stacks. The downward force of the depresser is provided by an elongated loop of steel tape (shimstock) which is clamped to the depresser at its upper end and is anchored at its lower end to the supporting plate which supports the ferroelectric stacks.

The yoke and said rollers are maintained against horizontal shifting with respect to the ferroelectric stacks by means of a flexure plate which is affixed at one end to the yoke and affixed at the other end to an anchor plate which is itself affixed to the two opposed rigid side walls of the transducer. Said supporting plate, the roof plate and the base plate of the transducer are all affixed to said rigid side walls.

The lower ends of the T-levers, which extend below the supporting plate, are joined together by a crossbrace to which is affixed one end of each of two output struts, which output struts directly drive or position the tool beam.

Both ferroelectric stacks are carried on the supporting plate, which is itself rigidly affixed to said opposed rigid sidewalls.

As will now be evident to those having ordinary skill in the art, the elongation of one stack and the contraction (shortening) of the other stack resulting from opposed electrical excitation of the stacks results in transverse displacement of the crossbrace along a slight arc, and thus results in corresponding longitudinal displacement of the output struts.

The outer ends of the output struts, remote from the crossbrace, are affixed to one end of the tool beam, which is itself supported on a pair of flexible steel H-plates.

Each H-plate of the invention consists of a thin sheet of stainless steel which is provided with etched slots defining a central opening (for receiving one end of the tool beam), an outer frame portion, and two inwardly projecting vertical fingers.

Opposite sides of each frame portion are affixed, respectively, to two rigid tool beam carrier side plates.

Thus, the tool beam carrier assembly is comprised of two H-plates, the frame portion of each of which is affixed to the corresponding ends of the two tool beam carrier side plates.

As will also be seen by those having ordinary skill in the art, the tool beam is provided, near each end, with upwardly and downwardly projecting bosses, and each boss is affixed to one of the fingers of one of the H-plates.

As mentioned hereinabove, the outer ends of both output struts are affixed to the tool beam at one end (the inner end) thereof.

Said tool beam carrier side plates are rigidly affixed to the base plate of the transducer.

Thus, as will now be apparent to those having ordinary skill in the art, the tool beam is constrained to move along a straight line located between the tool beam carrier side plates.

Arranging the two H-plates so that they resiliently suspend the tool beam constrains movement of the tool beam to a substantially straight line joining the center points of the H-plates. This arrangement is stiff radially and flexible axially.

The ferroelectric stacks are excited by an exciting circuit which is comprised of two oppositely-polarized 500 volt DC power supplies, and a driver amplifier the output voltage of which varies between 500 volts DC negative and 500 volts DC positive, the instantaneous magnitude of this voltage being determined by a suitable electrical modulating signal.

In a particular application of the ferroelectric transducer of the present invention a low-voltage modulating signal or command signal representing a specific desired tool displacement pattern is programmed into a tool displacement programmer which receives an electrical chuck angle signal from a shaft position encoder which is coupled directly to the workpiece chuck and an actual displacement signal representing at all times the position (displacement) of the tool beam, and provides an electrical error signal which is applied to and controls the operation of the driver amplifier.

After the application of the command signal representing a particular desired displacement pattern of the tool bar, the tool bar is advanced and a signal from the tool bar displacement transducer is compared to a command signal. When these two signals are equal, excitation voltages are maintained on their respective stacks until further changes in the command signal require the driving voltage to be adjusted. If the control signal operates at 160 Hz, the correction loop must be considerably faster in response to maintain precise correspondence between the displacement voltage and the command signal voltage.

Figure 1:
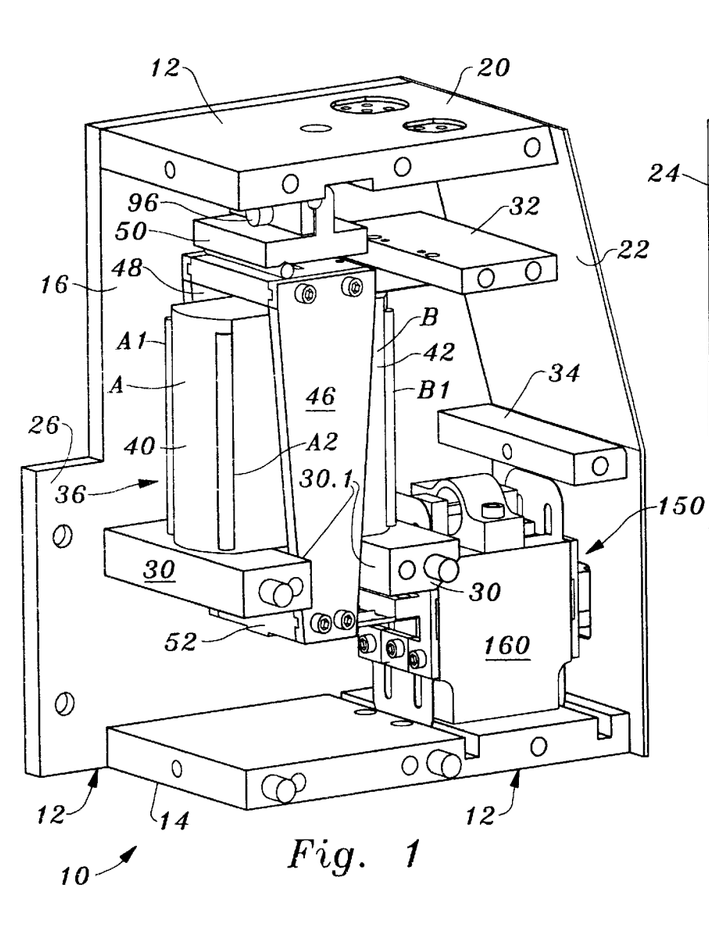
FIGS. 1 and 2 are perspective views of the ferroelectric transducer of the first preferred embodiment of the present invention.
Figure 2:
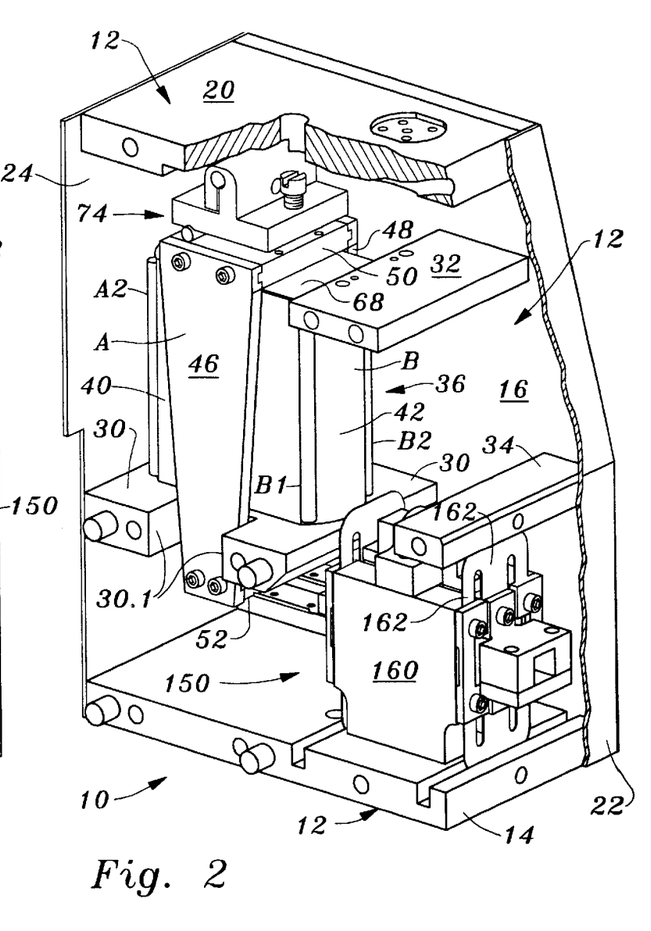

Referring now to FIGS. 1 and 2, there are shown two perspective views of a ferroelectric transducer 10 of the first preferred embodiment of the present invention.

Figure 6:
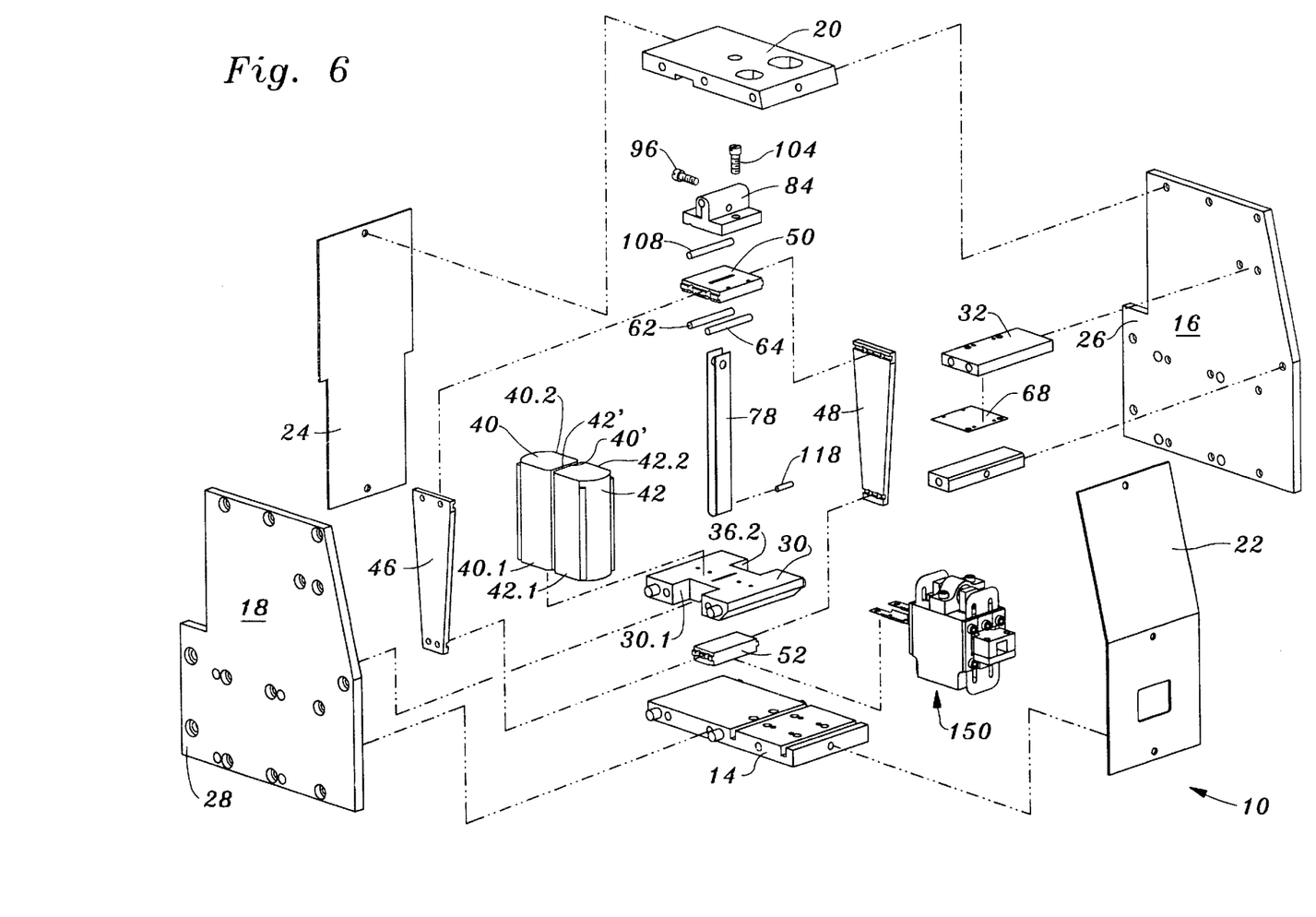
FIG. 6 is an exploded perspective view of the ferroelectric transducer of the first preferred embodiment of the present invention.

As may be seen by comparing FIGS. 1, 2 and 6, the active parts of transducer 10 are supported in operative collocation by means of a rigid frame 12.

Rigid frame 12 is erected upon and includes a rigid steel base plate 14.

A pair of rigid steel walls 16, 18 (FIG. 6) are rigidly affixed to the two longest edges of base plate 14 by means of suitable machine screws and aligning pins, which aligning pins are received in cooperating aligning bores to assure the perpendicularity of walls 16, 18 to the upper face of base plate 14.

As may further be seen by comparison of FIGS. 1, 2 and 6, a rigid steel roof plate 20 extends from wall 16 to wall 18, at the upper ends thereof, and is affixed to walls 16, 18 by means of suitable machine screws.

It will thus be seen by those having ordinary skill in the art, informed by the present disclosure, that the frame 12 of transducer 10 of the first preferred embodiment of the present invention consists of four rigid steel members 12, 16, 18, 20 which are joined together in rigidly maintained mutually parallel and perpendicular relationship.

As further seen in FIGS. 1 and 2, a front cover 22 and a back cover 24 are affixed to frame 12, and thus the active parts of transducer 10 are substantially completely enclosed.

Walls 16 and 18 are provided, respectively, with ears 26 and 28. Ears 26 and 28 project beyond back cover 24 and are provided with suitable mounting holes whereby transducer 10 may be rigidly mounted in apparatus of which transducer 10 is a part, e.g., a precision contact lens mold machining device.

As further seen in FIGS. 1 and 2, a rigid supporting plate 30 is rigidly mounted within frame 12, by being attached at its opposite ends to walls 16 and 18 by means of suitable machine screws and aligning pins in the well known manner.

A rigid anchoring plate 32 is also rigidly mounted within frame 12, its opposite ends being affixed to walls 16 and 18 respectively, by means of suitable machine screws.

Additional rigidity of frame 12 is also provided by a cross member 34 the opposite ends of which are affixed, respectively, to walls 16 and 18.

The active parts of transducer 10 located within frame 12 comprise two principal assemblies, viz., ferroelectric drive assembly 36 and tool beam carrier assembly 150.

As best seen by comparison of FIGS. 1, 2 and 6, ferroelectric drive assembly 36 is comprised of two ferroelectric stacks 40 and 42.

As best seen in FIG. 6, each ferroelectric stack 40, 42 takes the form of a cylinder having three elongated flattened faces the planes of which are parallel to the axis of the cylindrical face thereof.

As also seen in FIG. 6, ferroelectric stacks 40, 42 are so juxtaposed that their respective major flat faces 40', 42' are maintained in closely confronting relationship.

The internal structure of each of the ferroelectric stacks 40, 42 is described in detail hereinafter in connection with FIGS. 12 through 15.

As further indicated in FIG. 6, each ferroelectric stack 40, 42 is affixed to the upper face of supporting plate 30 by means of suitable machine screws coacting with tapped holes in the lower shoe plates of ferroelectric stacks 40, 42.

Also shown in FIG. 6 are the flat faces 40.1 and 40.2 of ferroelectric stack 40, and the flat faces 42.1 and 42.2 of ferroelectric stack 42.

As will be best seen in connection with FIGS. 1 and 2, flats 40.1, 40.2, 42.1 and 42.2 are provided for the purpose of preventing interference between T-levers 46, 48 and ferroelectric stacks 40, 42.

Figure 10:
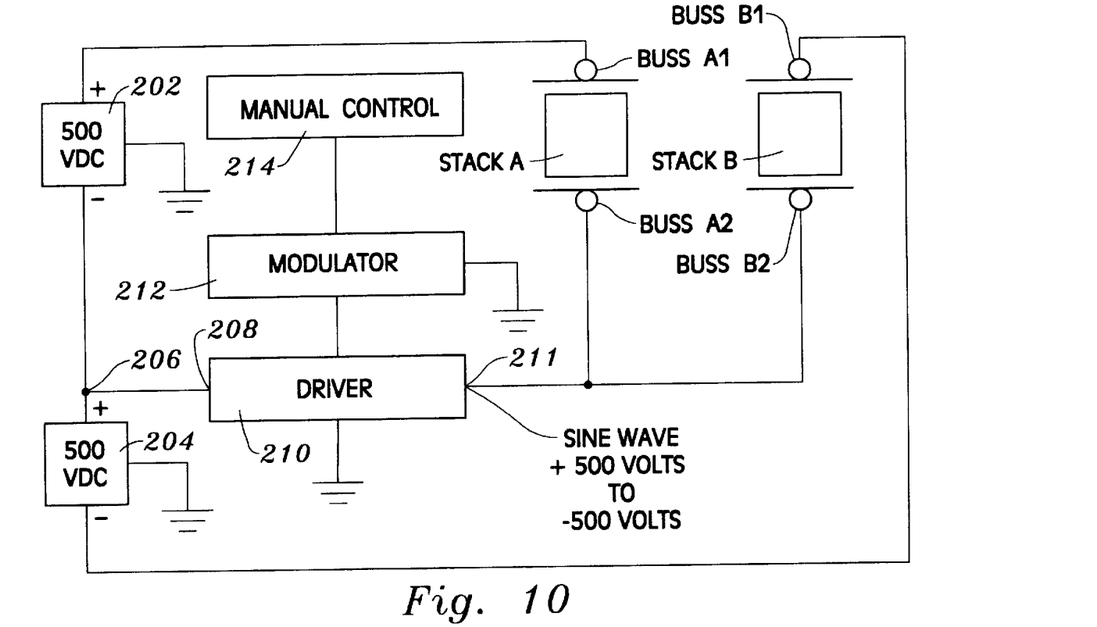
FIG. 10 is a schematic diagram of a circuit of the present invention which may be used to excite the ferroelectric transducer of the first preferred embodiment of the present invention.

As further seen in FIGS. 1 and 2, ferroelectric stack 40 sometimes is referred to herein as ferroelectric stack A, and ferroelectric stack 42 is sometimes herein referred to as ferroelectric stack B, for the purposes of electrical diagrams such as FIG. 10.

As also shown in FIGS. 1 and 2, ferroelectric stack 40 (stack A) is comprised of two epoxy-encapsulated busses A1, A2; and ferroelectric stack 42 (stack B) is comprised of two epoxy-encapsulated busses B1, B2. The structure of these busses will be explained hereinafter in connection with FIG. 15.

As best seen in FIGS. 1 and 2, T-levers 46 and 48 are joined at their upper ends by a yoke plate or yoke 50, and at their lower ends by a cross brace 52.

T-levers 46 and 48 are rigidly joined to yoke 50 and cross brace 52 by means of tongue-and-groove joints and suitable machine screws in such manner that the major faces of yoke 50 and cross brace 52 are rigidly maintained perpendicular to the major faces of T-levers 46 and 48.

Figures 3, 3A, 3B:
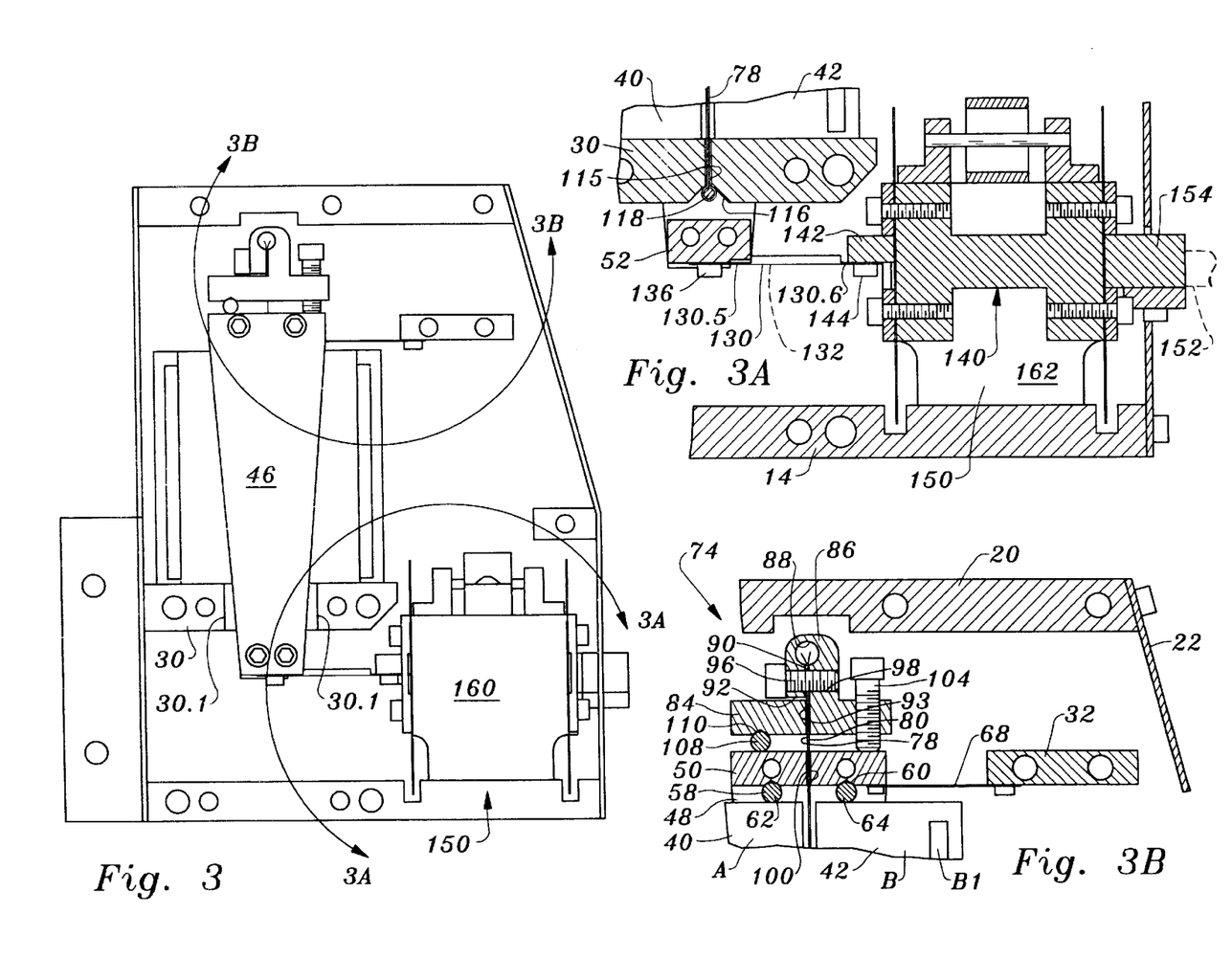
FIG. 3 is an elevational view of the ferroelectric transducer of the first preferred embodiment of the present invention.
FIGS. 3A and 3B are partial sectional views of the ferroelectric transducer of the first preferred embodiment of the present invention.

Further, the lower ends of T-levers 46, 48 can be seen to be received in notches 30.1, 30.2 which are formed in supporting plate 30. As best seen in FIG. 3, notch 30.1 is wider than the lower end of T-lever 46 and thus T-lever 46 can undergo small displacements from side-to-side within notch 30.1.

As will be understood by those having ordinary skill in the art, informed by the present disclosure, T-lever 48 (FIG. 6) coacts in the same manner with notch 30.2 of supporting plate 30.

Referring now to FIG. 3B, it will be seen that a pair of transverse grooves or channels 58, 60 are provided in the bottom of yoke plate 50, and that these channels or grooves are of triangular cross-section.

As also seen in FIG. 3B, a roller 62 is captive between channel 58 and the upper surface of ferroelectric stack 40, and a roller 64 is captive between channel 60 and the upper surface of stack 42.

Referring again to FIG. 3B, it will be seen that a flexure plate 68 (FIG. 6) is affixed at its opposite edges to yoke plate 50 and anchor plate 32 by suitable machine screws.

Figure 4:
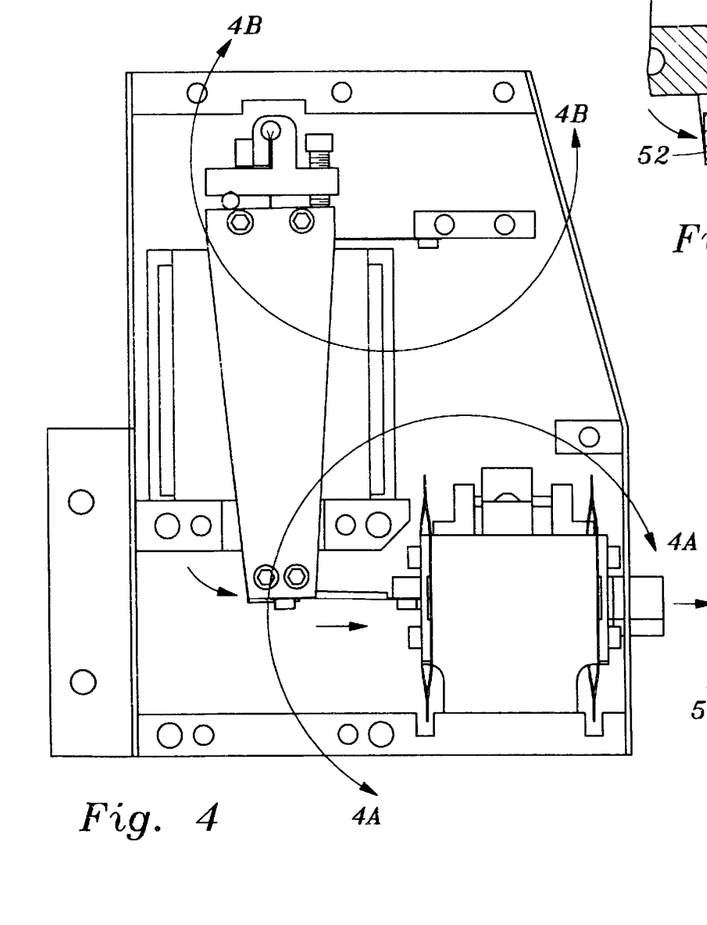
FIGS. 4, 4A and 4B, which correspond to FIGS. 3, 3A and 3B, show the ferroelectric transducer of the first preferred embodiment of the present invention during an outward stroke of its tool beam.
Figure 4A:
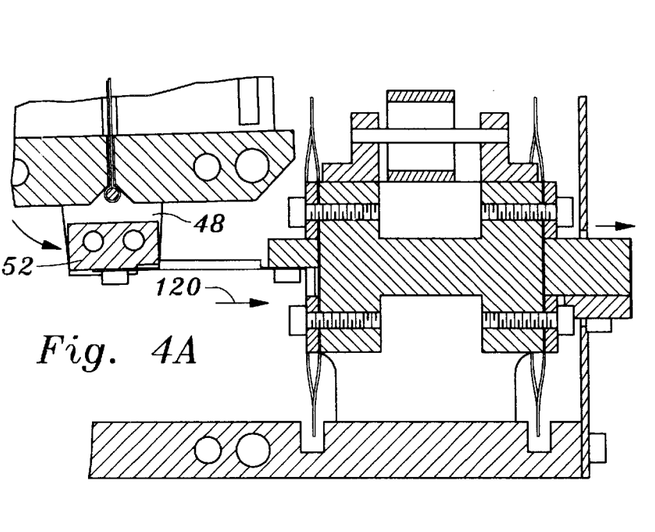
Figure 4B:
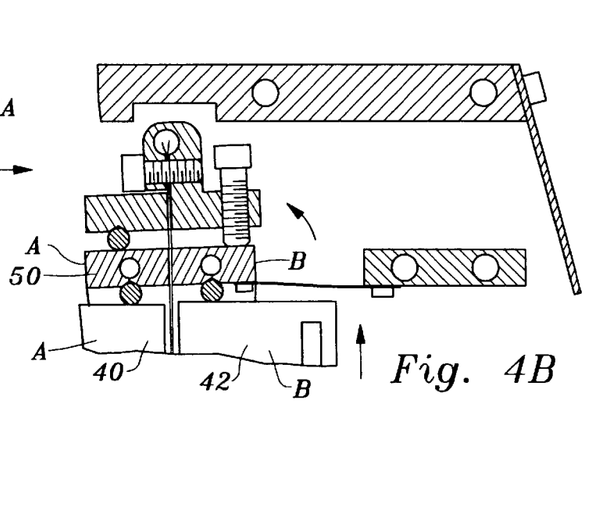
Figures 5, 5A, 5B:
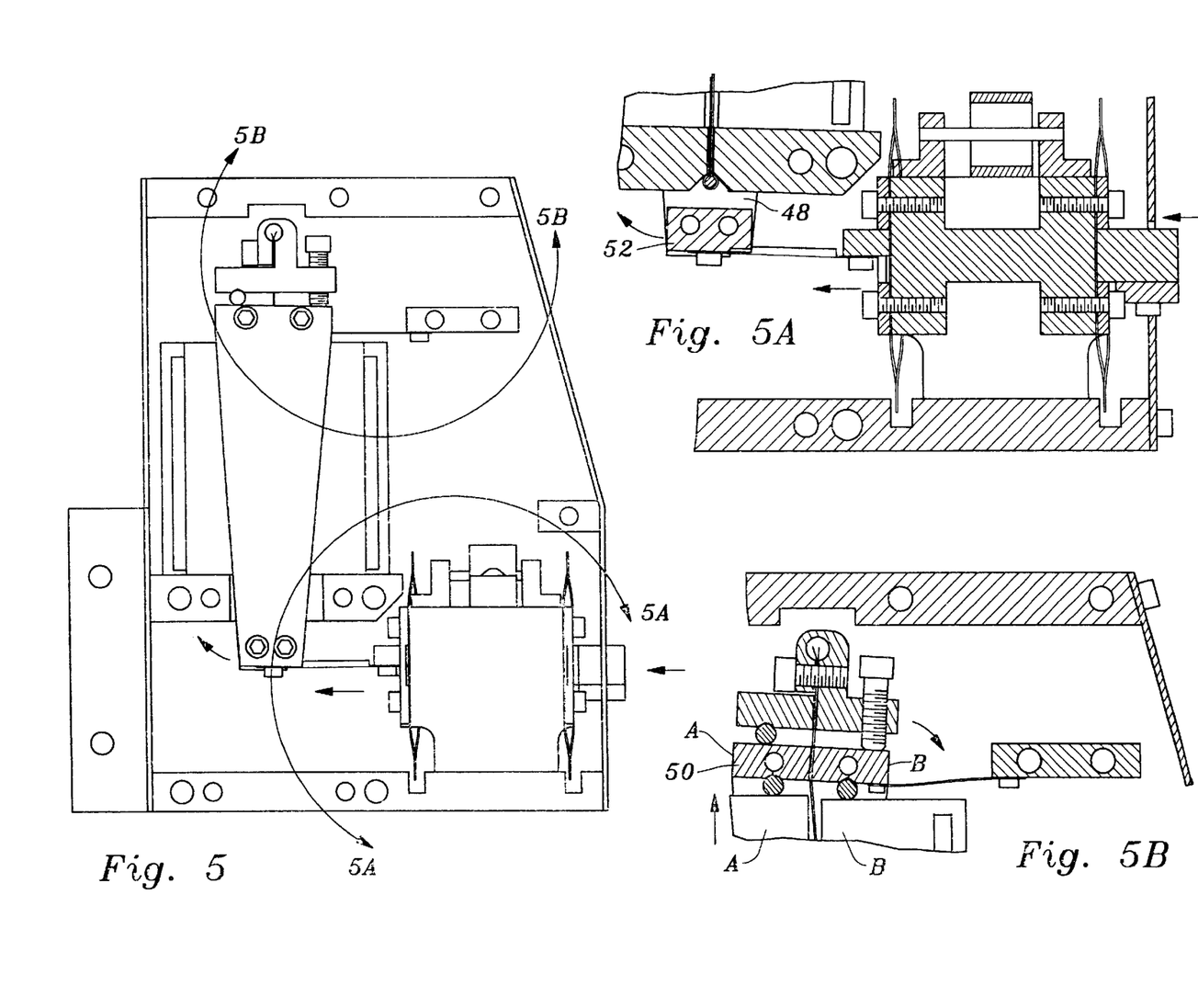
FIGS. 5, 5A and 5B, which correspond to FIGS. 3, 3A and 3B, show the ferroelectric transducer of the first preferred embodiment of the present invention during an inward stroke of its tool beam.

As will now be understood by those having ordinary skill in the art, informed by the present disclosure, flexure plate 68 prevents transverse motion of yoke plate 50 with respect to stacks 40, 42, and at the same time permits tilting or rocking motion of yoke plate 50, as may be seen by comparison of FIG. 3B, FIG. 4B, and FIG. 5B.

Comparing FIGS. 1, 2, and 3B, it will be seen that a depresser assembly 74 overlies yoke plate 50.

As seen in FIG. 3B, the upper end of a loop of steel tape 78 is captive in depresser 78.

As seen in FIG. 3B, tape 78 extends upwardly through a slot 80 formed in the main body 84 of depressor 74.

Extending upwardly from main body 84 and integral therewith is a clamp portion 86 of depresser 74.

A bore 88 extends from side to side of clamp portion 86, and a slot 90 extends downwardly from bore 88 to slot 92 which defines the lower end of movable jaw 93 of clamping portion 86.

A cap screw 96, sometimes called the "clamping screw" is engaged with a tapped hole 98 in the fixed jaw of clamping portion 86, and passes through a clearance hole in movable jaw 93.

As seen in FIG. 3B, the head of clamping screw 96 bears against the outer surface of movable jaw 93.

Thus it will be evident to those having ordinary skill in the art that by means of clamping screw 96 movable jaw 93 of clamping portion 86 can be forced against its associated fixed jaw, whereby to clamp the two upper ends of tape 78 firmly to depresser 74.

As seen in FIG. 1 there is but one clamping screw 96. As seen in FIG. 6, two elongated holes are provided in the respective ends of tape 78 to accommodate clamping screw 96.

As will now be seen by those having ordinary skill in the art, informed by the present disclosure, the two upper ends of tape 78 pass upwardly through slot 80, thence upwardly through slot 90, and extend into bore 88.

Thus, a preliminary tightening of tape 78 can be accomplished by means of, say, long-nose pliers grasping the upper ends of tape 78 which project into bore 88.

The upper ends of tape loop 78 are then clamped tightly in clamping portion 86 by setting up clamping screw 96 against movable jaw 93.

As also seen in FIG. 3B, tape loop 78 extends downwardly from main body 84 and thence through a slot 100 in yoke plate 50, whereafter it further extends downwardly between poles 40 and 42.

As further seen in FIG. 3B, additional tension can be applied to tape loop 78 by means of a cap screw 104 which serves to pivot depresser main body 84 about a roller 108 which bears upon the top surface of yoke plate 50.

As also seen in FIG. 3B, roller 108 is captive in a groove 110 of triangular cross-section which is formed in the lower face of main body portion 84.

Referring now to FIG. 3A, it will be seen that the lower end of tape loop 78 passes through a slot 115 provided in supporting plate 30.

As there seen, a groove or channel 116 of triangular cross-section is provided in the lower face of supporting plate 130 and slot 115 terminates in the apex of groove or channel 116.

The lower end of tape loop 78, i.e., the central portion thereof, passes around a rod 118 which is contained in channel 116.

As also seen in FIG. 3A, tape loop 78 passes between stacks 40 and 42.

As will now be evident to those having ordinary skill in the art, informed by the present disclosure, tape loop 78 is secured to supporting plate 30 and to depresser 74, and thus rollers 62 and 64 (FIG. 3B) are pressed against the respective tops of stacks 40 and 42.

Referring again to FIG. 3B, it is to be understood that the apparatus of the first preferred embodiment of the present invention is there shown in its unexcited state. That is to say, stacks 40 and 42 are not electrically excited.

Since stacks 40 and 42 are not electrically excited the top surfaces of stacks 40 and 42 lie in the same horizontal plane, and thus the upper face of yoke plate 50 is substantially horizontal.

Since the upper face of yoke plate 50 is substantially horizontal, and T-levers 46 and 48 are rigidly affixed to yoke plate 50 with their center lines perpendicular to yoke plate 50, it follows that T-levers 46 and 48 are vertically disposed, and thus that cross brace 52 is at the center of its stroke.

Referring now to FIGS. 4A and 4B, it will be seen in FIG. 4A that the top of stack 42 is elevated above the top of stack 40, because these stacks are respectively electrically excited in their shortening mode and elongation mode by associated electrical circuits which will be described hereinafter.

Thus, as seen in FIG. 4B, yoke plate 50 is tilted so that its B-edge (located above stack B) is elevated above its A-edge (located above stack A).

Since cross brace 52 is joined into a rigid frame with yoke plate 50 by T-levers 46, 48, it follows that the tilting of yoke plate 50 causes cross brace 52 (FIG. 4A) to move rightwardly toward its maximum displacement as shown by arrow 120.

Similarly, as shown in FIG. 5B, the excitation of stacks A and B in opposite polarity to the excitation applied in FIG.

4B causes yoke plate 50 to be tilted in the opposite direction, i.e., with its A edge elevated above its B edge.

It follows, as shown in FIG. 5A, that cross-brace 52 is moved inward, in a direction opposite to the outward movement shown in FIG. 4A.

Thus it will be seen by those having ordinary skill in the art, informed by the present disclosure, that alternating excitation of stacks 40 and 42, i.e., in alternating polarity, causes cross brace 52 to execute successive outward and inward strokes, as shown respectively in FIG. 4A and FIG. 5A.

Figure 7:
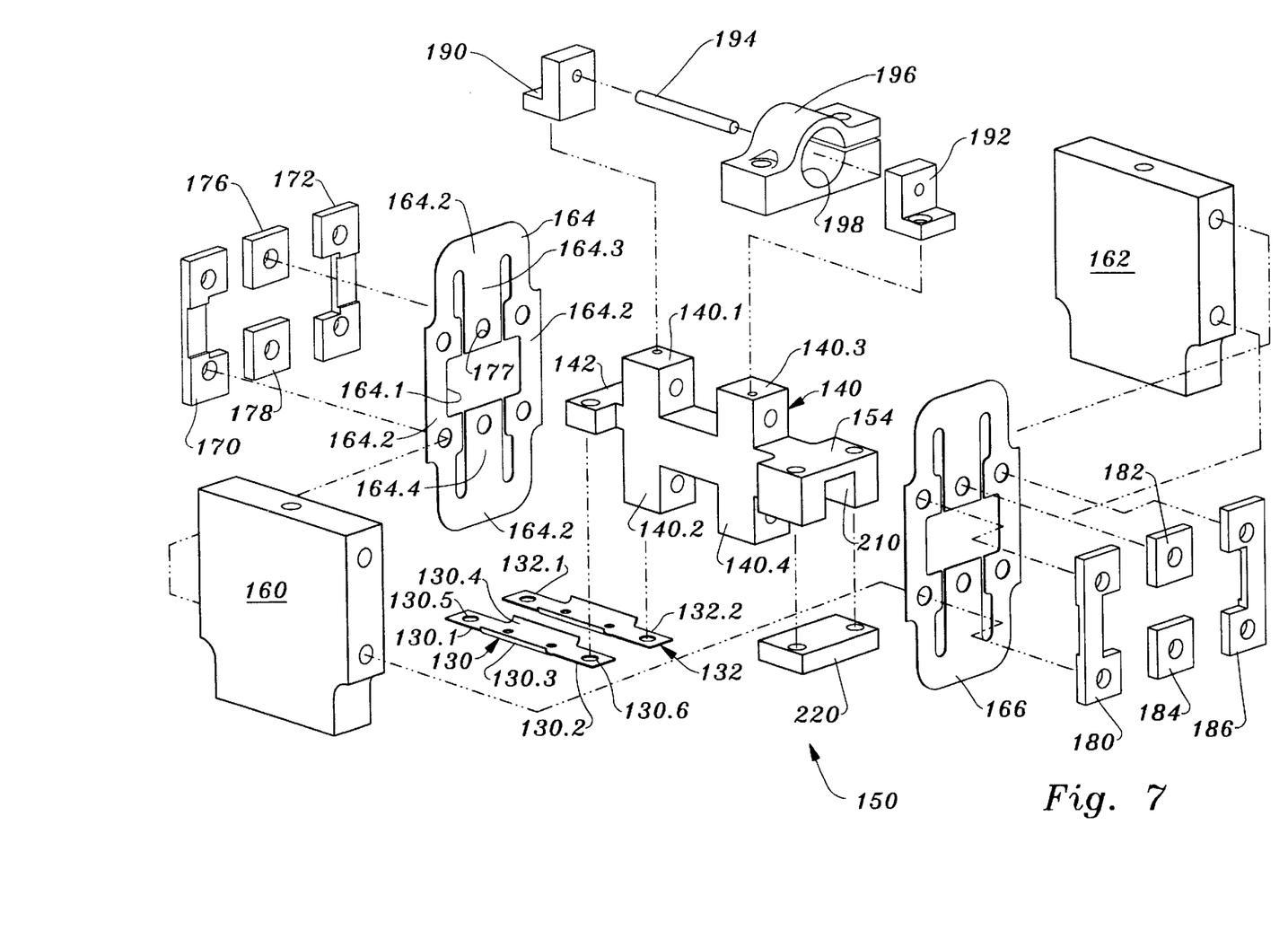
FIG. 7 is an exploded perspective view of the tool beam carrier assembly of the ferroelectric transducer of the first preferred embodiment of the present invention.

As may be seen by comparison of FIG. 3A and FIG. 7, a pair of tool beam driving struts 130, 132 extend between cross brace 52 and tool beam 140.

As seen in FIG. 7, each strut 130, 132 is provided with upturned rigidifying flanges, e.g., 130.3, 130.4, and is provided at each end with a flexible ear, e.g., 130.5, 130.6.

Referring again to FIG. 3A, it will be seen that inner ear 130.5 of strut 130 is affixed to cross brace 52 by means of a suitable cap screw 136.

The inner ear of strut 132 is affixed to cross brace 52 in the same manner.

As further seen in FIG. 3A, the outer ear 130.6 of strut 130 is affixed to integral crossbar 142 of tool beam 140 by means of a cap screw 144.

The outer ear 132.6 of strut 132 is also affixed to integral cross bar 142 of tool beam 140, in the same manner.

As will be explained hereinafter, tool beam 140 is suspended in tool beam carrier assembly 150 for longitudinal movement over a short stroke.

By "longitudinal movement" it is meant movement from side to side as seen in FIG. 3A, tool beam 140 remaining at substantially the same elevation from base plate 14 throughout said short stroke.

It is to be understood that tool beam carrier assembly 150 constitutes a principal feature of the present invention, and that by the use of tool beam carrier assembly 150 the problem of "stiction" which would obtain if tool beam 140 were slidably mounted is eliminated.

It follows, then, that the inward and outward movements of cross brace 52 are precisely followed by tool beam 140, and that any tool 152 which is clamped in the tool clamp located at the outer end 154 of tool beam 140 also faithfully reproduces the movement of cross brace 52.

Referring now to FIG. 7, it will be seen that tool beam carrier assembly 150 is comprised of two supporting plates 160, 162.

As may be seen by comparison of FIGS. 1, 2, 3 and 3A, supporting plates 160 and 162 are affixed to base plate 14, as by means of suitable set screws, and that clearance slots 14.1, 14.2 (FIG. 2) are provided in base plate 14 to accommodate the lower ends of H-plates 164, 166.

Returning to FIG. 7, it will be seen that tool beam carrier assembly 150 is further comprised of a pair of thin, flexible H-plates 164, 166, which are fabricated, e.g., from stainless steel shim stock.

Taking H-plate 164 as an example, it will be seen in FIG. 7 that H-plate 164 is provided with a central window 164.1, an outer frame 164.2, and two fingers 164.3, 164.4 projecting from said frame inward to the edge of window 164.1.

H-plate 166 is substantially identical to H-plate 164.

Figure 8:
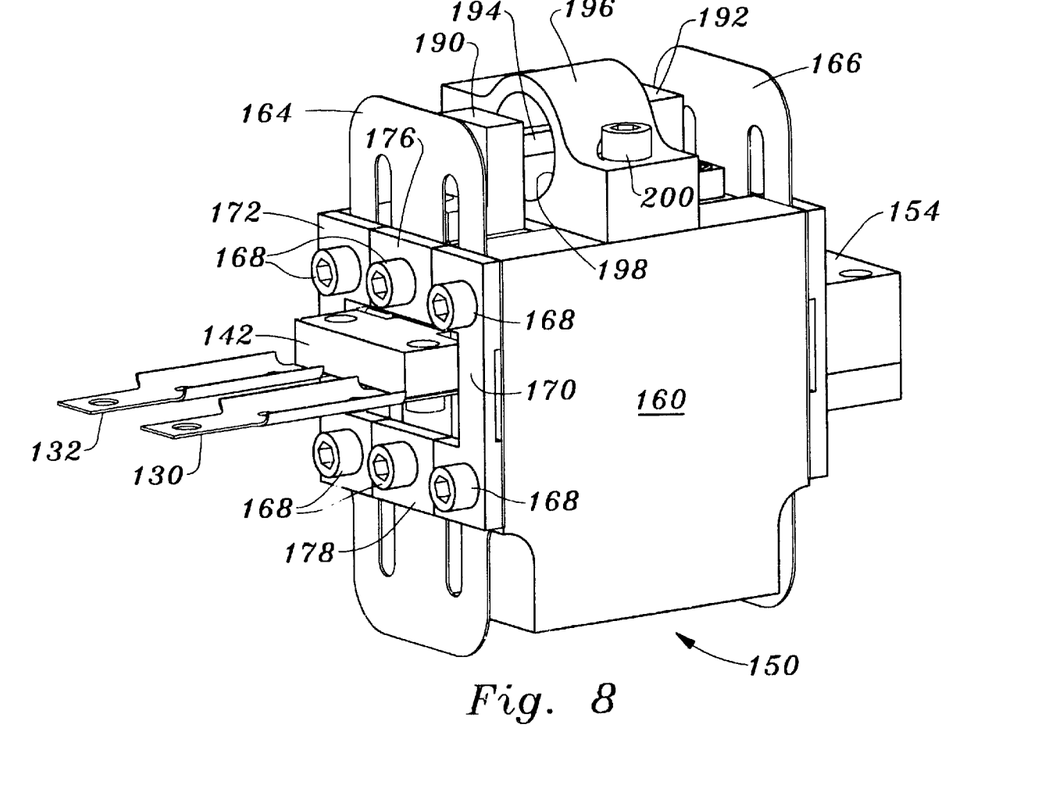
FIG. 8 is a perspective view of the tool beam carrier assembly of the ferroelectric transducer of the first preferred embodiment of the present invention.

As seen by comparison of FIGS. 7 and 8, H-plate 164 is affixed to the corresponding ends of supporting plates 160, 162 by means of four cap screws 168 which pass through retainers 170, 172, thence through corresponding holes in frame 164.2, and thence into corresponding tapped holes in the ends of supporting plates 160, 162.

The other H-plate 166 is similarly affixed to the opposite ends of supporting plates 160, 162.

As also seen in FIG. 7, the upwardly and downwardly projecting ears 140.1, 140.2, 140.3 and 140.4 of tool beam 140 are affixed, respectively, to the inner ends of fingers 164.3, 164.4, 166.3, 166.4 of H-plates 164, 166.

Thus, for example, upwardly projecting ear 140.1 of tool beam 140 is affixed to the outer end of downwardly projecting finger 164.3 of H-plate 164 by means of a cap screw 175 which passes through retainer 176, thence through hole 177 in the outer end of finger 164.3 and thence into a tapped hole in upwardly projecting ear 140.1 of tool beam 140.

Upwardly projecting ear 164.4 is similarly affixed to lower ear 140.2 of tool beam 140 by means of a tap screw which passes through the central hole in retainer 178 (FIG. 7), thence through the hole in the outer end of finger 164.4 and thence into a tapped hole in ear 140.2 of tool beam 140.

It is to be understood that H-plate 166 is assembled to ears 140..3 and 140.4 of tool beam 140 by means of cap screws passing through retainers 182, 184 in the same manner in which H-plate 164 is affixed to ears 140.1, 140.2 of tool beam 140.

Again comparing FIGS. 7 and 8, it will be seen that a pair of L-shaped brackets 190, 192 are affixed, respectively, to the upper ends of upper ears 140.1 and 140.3 of tool beam 140.

Thus, it will be seen that L-brackets 190, 192 move in synchronism with tool beam 140.

As also there seen, a rod 194 is affixed at its opposite ends to respective L-brackets 190, 192, and thus moves in synchronism with tool beam 140.

A housing 196 having a large central opening 198 is affixed to the top surfaces of supporting plates 160, 162 by suitable cap screws, e.g., 200 (FIG. 8).

In accordance with the preferred embodiment of the present invention, the armature of a linear variable differential transformer (LVDT) is affixed to rod 194, and the winding assembly of the same linear variable differential transformer is fixed in bore 198 of housing 196.

As will be obvious to one having ordinary skill in the art, informed by the present disclosure, the signals provided by this linear variable differential transformer, when suitably excited, are in substantially exact proportion to the displacement of tool beam 140 from its central (undeflected) position.

Referring again to FIG. 7, it will be seen that the outer end 154 of tool beam 140 contains a cavity 210.

Cavity 210 is configured to tight-fittingly receive the shank of a tool which is to be driven by transducer 10 of the first preferred embodiment of the present invention.

As seen in FIG. 7, a plate 220 is adapted to be affixed to the lower face of outer end 154 of tool beam 140, as by means of suitable cap screws.

As will be evident to those having ordinary skill in the art, informed by the present disclosure, many other means of mounting associated tools on tool beam 140 may be employed in particular applications of the present invention.

Further, when the particular tool receiving means of the first preferred embodiment shown in FIG. 7 is employed, locking bosses for locking the associated tool in place in cavity 210 may be provided, e.g., on the top of plate 220, and on the inner horizontal face of cavity 210, which locking bosses are received in suitable indentations in the associated walls of cavity 210.

Figure 9:
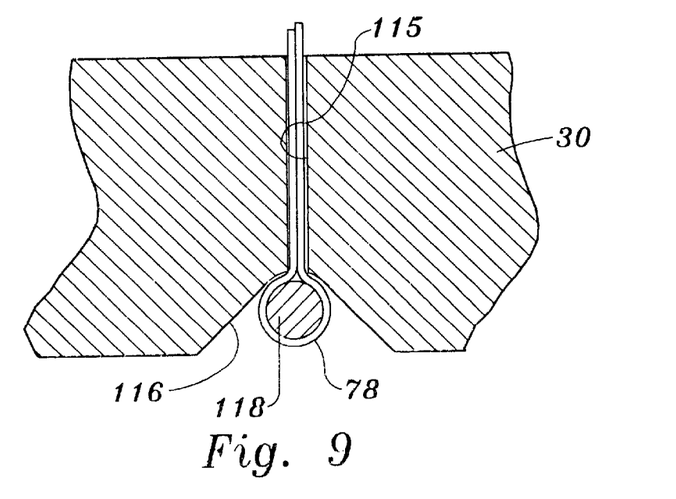
FIG. 9 is a partial sectional view of the ferroelectric transducer of the first preferred embodiment of the present invention.

Referring now to FIG. 9 there is shown in detail the lower end of suspension tape 78 and its mode of affixation to supporting plate 30 by means of pin 118 which, with the lower end of tape 78, engages in groove or channel 116 formed in the lower face of supporting plate 30.

As seen in FIG. 9, both side of tape loop 78 extend upward through a slot 115 formed in supporting plate 30, which slot terminates in the apex of groove 116.

Referring now to FIG. 10, there is shown a schematic diagram of a circuit of the present invention which may be used to excite the ferroelectric transducer of the first preferred embodiment of the present invention for test purposes.

Testing circuit 200 is comprised of two 500 volt DC supplies 202, 204.

The positive terminal of power supply 202 is directly, conductively connected to buss A1 of stack A.

The negative terminal of power supply 204 is directly, conductively connected to buss B1 of stack B.

The negative terminal of power supply 202 is directly, conductively connected to common point 206 and the positive terminal of power supply 204 is directly, conductively connected to common point 206.

The input terminal 208 of a driver circuit 210 is directly, conductively connected to common point 206.

The output wave form of driver circuit 210 appearing at output terminal 211 is modulated by modulator 212 in such manner that the wave form of the voltage appearing at output terminal 211 takes the form of a sine wave having a maximum positive peak value of 500 volts and a maximum negative peak value of ~500 volts.

The operation of modulator 212 is controlled by a manual control 214, whereby the positive and negative peak amplitudes of the output sine wave appearing at terminal 211 of driver 210 may be made to assume any desired value, ranging from said maximum peak values to zero volts.

As shown in FIG. 10, buss A2 of stack A and buss B2 of stack B are both directly, conductively connected to output terminal 211 of driver 210.

Figure 11:
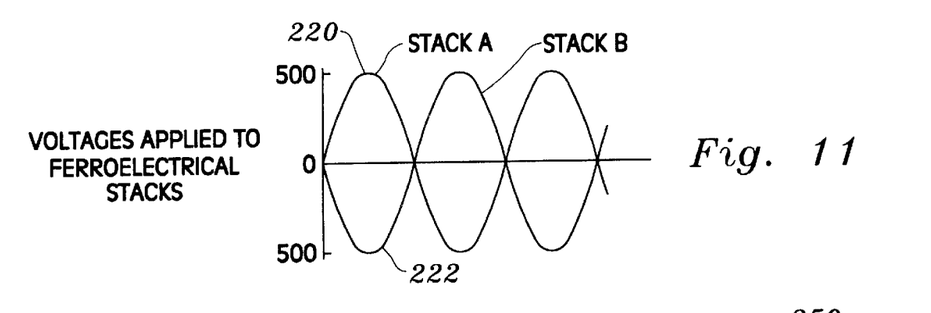
FIG. 11 is a schematic representation of typical waveforms of the electrical signals applied to the ferroelectric stacks of the ferroelectric transducer of the first preferred embodiment of the present invention.

Referring now to FIG. 11, there is shown a pair of sinusoidal wave forms representing, respectively, the voltages applied between the busses of the two stacks A and B.

The voltage of wave form 220 is applied between buss A1 and buss A2 of stack A, and, at the same time, the voltage of wave 222 is applied between buss B1 and buss B2 of stack B.

Figure 12:
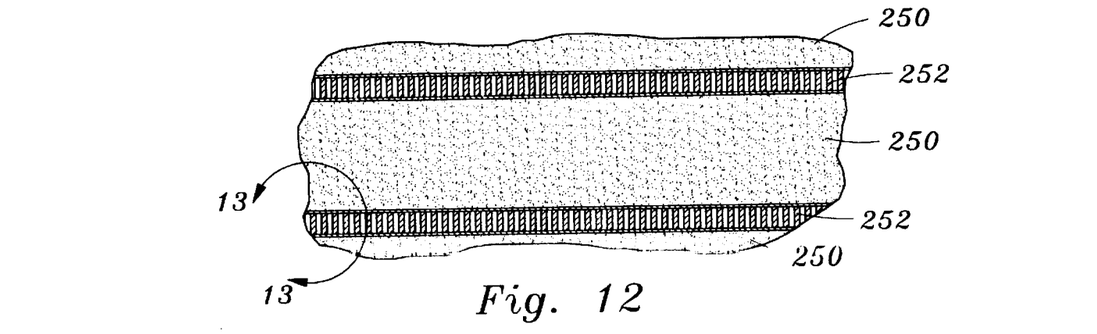
FIG. 12 is a partial sectional view of one of the two ferroelectric stacks of the ferroelectric transducer of the first preferred embodiment of the present invention.

Referring now to FIG. 12, there is shown a partial sectional view of one of the two ferroelectric stacks of the ferroelectric transducer of the first preferred embodiment of the present invention.

Areas 250 of FIG. 12 represent in section three of the ferroelectric ceramic disks which are the active elements of both stacks A and B.

Disks 250 are fabricated from a lead zirconate titanate ceramic material with various added dopants, and preferably from the ferroelectric ceramic material commercially sold by Kinetic Ceramics, Inc., of Hayward, Calif., U.S.A.

Figure 13:
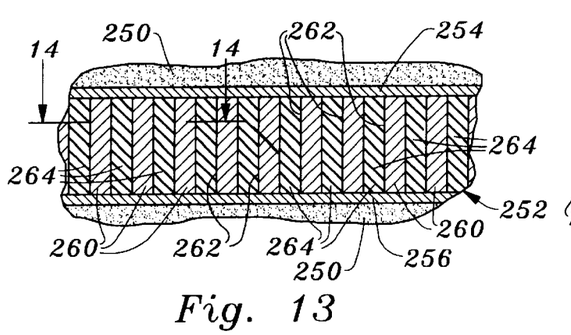
FIG. 13 is an enlarged view of a part of the structure shown in FIG. 12.
Figure 14:
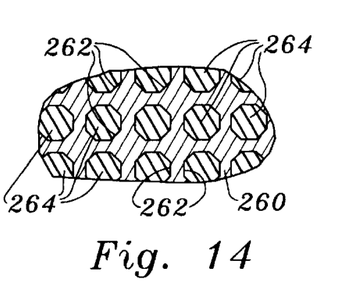
FIG. 14 is a transverse sectional view of the ferroelectric stack shown in FIG. 13, taken on plane 14—14 of FIG. 13.

A detailed representation of the intermediate structures 252 shown in FIG. 12 is found in FIGS. 13 and 14.

Layers 254 and 256 shown in FIG. 13 are vacuum plated aluminum, plated on the adjoining ceramic disks 250 the thickness of each of which is 6000 to 7000 Angstroms.

All of the active disks 250 are thus aluminum plated on both sides.

As best seen by comparison of FIGS. 13 and 14, a sheet 260 of beryllium copper is disposed between the aluminum plated faces of the two disks 250 shown in FIG. 13.

As also shown by comparison of FIGS. 13 and 14, a plurality of passages 262 of hexagonal cross-section pass completely through beryllium copper sheet 260.

As also shown in FIGS. 13 and 14, each of the hexagonal passages 262 is completely filled with epoxy cement 264.

Figure 15:
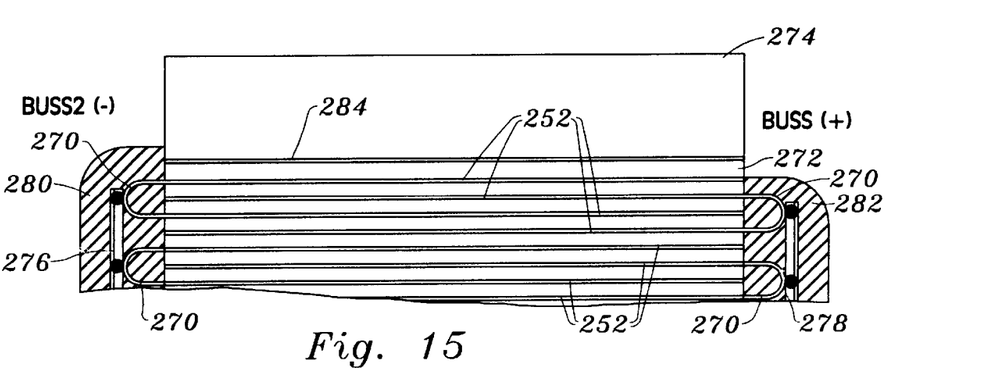
FIG. 15 is a sectional view of one end of a ferroelectric stack of the first preferred embodiment of the present invention.

Referring now to FIG. 15 there is shown a sectional view of one end of a ferroelectric stack of the first preferred embodiment of the present invention.

As seen in FIG. 15, alternate ones of the intermediate structures 252 (FIG. 13) are interconnected by bridges 270. Bridges 270 are preferably fabricated from and integral with the beryllium copper sheeting 260 of the two intermediate structures 252 which they join.

A passive disk 272 formed from the same material as active disks 250 is affixed to the upper face of the uppermost intermediate structure 252, and a thick steel shoe plate 274 is affixed to the outer face of passive ceramic disk 272.

It is to be understood that a substantially identical passive disk 272' and a shoe plate 274' are affixed to the opposite end of the ferroelectric stack the upper end of which is shown in FIG. 15.

As also seen in FIG. 15, alternate ones of the pairs of intermediate assemblies 252 are connected, respectively, to busses 276 or 278 by way of their bridges 270, which are brazed, respectively, to busses 276 and 278.

As further seen in FIG. 15, busses 276 and 278 and their associated bridge structures are encapsulated in epoxy ridges 280, 282 which extend substantially from end to end of the ferroelectric stack the top of which is shown in section in FIG. 15.

It is to be also noted that shoe plate 274 is affixed to passive ceramic disk 272 by means of a beryllium copper disk 284 which is substantially identical to the beryllium copper disk 260 shown in FIGS. 13 and 14, and the hexagonal passages of which are filled with epoxy cement, by means of which shoe plate 274 is bonded to passive ceramic disk 272, the only substantial different being that no electrical connection means is provided for making an electrical connection to beryllium copper sheet 284.

Passive disk 272' and shoe plate 274' are joined in the same manner.

In the preferred embodiment of the present invention beryllium copper disks 260 may be from 20 mils to 40 mils thick, and ceramic disks 250 may be from 18 mils to 20 mils (0.001 inches) thick.

The number of ceramic disks 250 varies in accordance with such factors as available exciting voltage, thickness of the available ceramic disks, etc., and the disks in a typical stack may range from 60 to 200 or more.

In the first preferred embodiment each stack is approximately one inch in diameter and 1.6 inches high.

It is further to be understood that in any stack used in the preferred embodiment of the present invention there will be an even number of active disks 250, and that alternate intermediate structures 252 will be connected to opposite busses, and therefore excited alternately in opposite polarity.

Thus, it will be understood that in any stack of the first preferred embodiment of the present invention the uppermost electrode or intermediate element 252 and the lowermost electrode or intermediate element 252 will be connected to the same buss (276).

Figure 16:
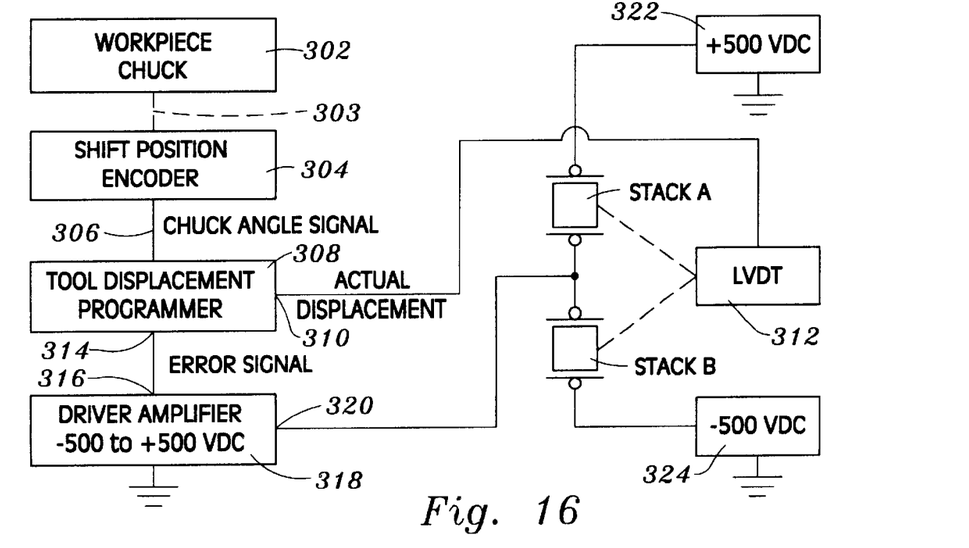
FIG. 16 is a schematic representation of a circuit of the present invention which is adapted for use in a precision machine tool in which the ferroelectric transducer of the first preferred embodiment of the present invention is incorporated.

Referring now to FIG. 16, there is shown a schematic representation of a circuit of the present invention which is adapted for use in precision machine tools in which the ferroelectric transducer of the first preferred embodiment of the present invention is incorporated.

Seen in FIG. 16 is a workpiece chuck 302 in which is clamped the workpiece to be operated upon by tool 152 (FIG. 3A).

Workpiece chuck 302 is coupled by suitable coupling means 303 of well known type to a shaft position encoder 304 which provides an electrical signal on output buss 306 which represents the instantaneous angular position of workpiece chuck 302 about its axis.

The chuck angle signal on buss 306 is supplied to a tool displacement programmer 308 which is programmed in accordance with the contour of the surface desired to be produced in the workpiece clamped in workpiece chuck 302.

As seen in FIG. 16, tool displacement programmer 308 receives at its input terminal 310 a signal corresponding to the actual displacement of the tool, i.e., to the actual displacement of tool beam 140 (FIG. 7), which signal is supplied by the linear variable differential transformer 312 the winding of which is mounted in housing 196 of tool beam carrier assembly 150 (FIG. 7), and the armature of which is affixed to armature rod 194 (FIG. 7).

Thus, tool displacement programmer 308 provides at its output terminal 314 an error signal which is applied to input terminal 316 of driver amplifier 318.

Driver amplifier 318, accordingly, produces at its output terminal 320 an alternating voltage which is supplied to stack A and stack B in the manner indicated in FIG. 16, thus causing the tool which is operating upon the workpiece clamped in workpiece chuck 302 to be momentarily positioned in such a manner as to generate upon the workpiece the surface contour which is programmed into tool displacement programmer 308.

The 500 volt DC power supplies 322 and 324 function in the same manner and for the same purpose as the two 500 volt DC power supplies 202 and 204 shown in FIG. 10.

While the first preferred embodiment of the present invention as shown and described herein is of the variety in which both ferroelectric stacks are active, i.e., are electrically excited, it is to be understood that in other embodiments of the present invention, responding to certain specialized requirements, only one of the ferroelectric stacks may be active, the other being passive, i.e., not electrically excited.

It is also to be understood that within the scope of the present invention certain embodiments thereof may embody but one ferroelectric stack, the other ferroelectric stack being replaced by, e.g., an integral body of alumina the height of which is equal to the unexcited height of the active stack.

In the testing circuit of FIG. 10 modulator 212 can be a sine wave generator of well known type or, in some test situations, a shaft position encoder of well known type.

Also in the testing circuit of FIG. 10, driver 210 may be a controllable output power supply, e.g., a KEPCO 100BOP bipolar programmable power supply. In certain embodiments of the testing circuit of FIG. 10 modulator 212 may be a commercially available power supply the output voltage level of which is responsive to manipulation of a manual control such as a knob, embodied therein. In this case, manual control 214 will be the output control section of modulator 212 and its manually operable knob or the like.

Linear variable differential transformers suitable for use as LVDT 312 shown in FIG. 16 are well known and commercially available.

As is well known to those having ordinary skill in the art, the primary winding of such a linear variable differential transformer must be excited from a suitable AC voltage source. In the actual device embodying the first preferred embodiment of the present invention the frequency of the exciting voltage applied to the primary winding of the linear variable differential transformer incorporated into tool beam carrier assembly 150 (FIG. 7) was 20 kHz, which can be obtained from an ordinary, commercially available AC power supply.

It is to be understood that the ferroelectric elements 250 of the ferroelectric stacks of the present invention are first assembled into a complete stack in their non-polarized state, and, after the assembly of the stack, polarizing voltages are applied to the ferroelectric elements 250 via busses 276 and 278.

In the first preferred embodiment of the present invention T-levers 46 and 48, cross brace 52 and tool beam 140 are fabricated from low-weight, high-strength material such as titanium or beryllium.

In the tool tractor 10 of the first preferred embodiment of the present invention a tool motion of 0.5 mm and a force of six pounds can be achieved in a tractor having a full stroke response of better than 100 Hz.

As seen in FIGS. 1 and 2, a pair of receptacles are secured in apertures passing through roof plate 20. From these receptacles internal connections are made within ferroelectric transducer 10 by means of which exciting voltages may be applied to the busses of the ferroelectric stacks 40, 42, and by means of which exciting voltage may be conveyed to the linear variable differential transformer incorporated in tool beam carrier assembly 150, and by means of which the output signals from that linear variable differential transformer may be derived.

Tool beam 140 is caused by H-plates 164, 166 (FIG. 7) to move in a linear path, thus insuring that the entire tool beam 140 passes linearly forward and backward without change in pitch angle. By this means it is insured that the tool secured in tool clamp 154 (FIG. 7) is advanced into the workpiece at a constant angle, and will remain in the same attitude through a cutting operation.

It is also to be noted that this output device is friction-free, and that thus its control resolution is almost infinite.

The output motion of ferroelectric transducer 10 can be controlled to provide displacement increments of as little as one microinch.

Ferroelectric transducer 10 can be programmed to follow a sine wave at up to 100 Hz.

The preload on stacks A and B can be readily adjusted by means of vertical adjusting screw 104 (FIG. 3B).

The forces acting horizontally on the T-lever assembly 46, 48, 50, 52, are reacted on a flexure member 68 attached to yoke plate 50 and also attached to anchor plate 32. This provision avoids the bodily displacement of the T-lever assembly due to the absence of lateral support.

A feedback position sensor (LVDT) is built in to tool beam position carrier assembly 150 to provide position monitoring of tool beam 140. As see in FIG. 16, the position monitoring signal provided by this LVDT is compared with the command signal generated within tool displacement programmer 308 and a chuck angle signal set (buss 306) to produce an error difference signal which will be employed to make corrections of appropriate polarity to the stack driving voltages. While the LVDT used in the first preferred embodiment of the present invention is custom made by a supplier to Kinetic Ceramics, Inc., a commercially available substitute is made by Lucas-Schaevitz, by which source it is designated as Part No. E100. There are several other manufacturers of suitable units.

The material of tape loop 78 is preferably stainless steel shimstock 0.375 inches wide. Lower tape anchor pin 118 is a simple steel dowel pin around which tape 78 passes, as seen in FIG. 9.

The upper ends of tape loop 86 are brought together in preloading clamp 86. Both ends of tape 78 are fed into the clamp slot in preloading clamp 86, whereafter bolt 96 is passed through holes in the ends of tape loop 78 (FIG. 6).

The sine wave generator or modulator 212 (FIG. 10) employed in the testing of ferroelectric transducer 10 of the first preferred embodiment of the present invention is an Interstate high-voltage function generator, type F43. Shaft position encoder 304 (FIG. 16) in the first preferred embodiment of the present invention may be an optical shaft position encoder such as an Oak-Grigsby 1000 NIBC.

It will thus be seen that the objects set forth above, among those made apparent from the preceding description, are efficiently attained, and since certain changes may be made in the above constructions and the method carried out thereby without departing from the scope of the present invention it is intended that all matter contained in the above description or shown in the accompanying drawings shall be interpreted as illustrative only, and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A ferroelectric transducer, comprising:
   a rigid frame having a base plate, a roof plate, and a plurality of side walls;
   supporting plate means immovably affixed to opposite ones of said side walls and located above and spaced from said base plate;
   a first ferroelectric stack the lower end of which bears upon said supporting plate means;
   a second ferroelectric stack the lower end of which bears upon said supporting plate means;
   a yoke plate overlying said ferroelectric stacks and provided on its lower face with first and second elongated, parallel indentations, each of which indentations overlies one of said ferroelectric stacks;
   a first roller disposed between said yoke plate and the upper end of said first ferroelectric stack and engaged with one of said indentations;
   a second roller disposed between said yoke plate and the upper end of said second ferroelectric stack and engaged with the other one of said indentations;
   depressor means for exerting downward force on the top of said yoke plate and thus pressing said rollers against the respective upper ends of said ferroelectric stacks;
   anchor plate means immovably affixed to opposite ones of said side walls and juxtaposed to said yoke plate in a predetermined juxtaposition when said first and second ferroelectric stacks are unexcited; and
   flexure plate means affixed adjacent its opposite ends to said yoke plate and to said anchor plate means respectively, whereby to prevent transverse motion of said yoke plate with respect to said ferroelectric stacks, and at the same time to permit tilting or rocking motion of said yoke plate.

2. A ferroelectric transducer as claimed in claim 1, further comprising:
   first and second displacement multiplication levers affixed respectively to opposed ends of said yoke plate, embracing the mutually confronting portions of said ferroelectric stacks and extending below the lower face of said supporting plate means; and
   cross-brace means interconnecting the portions of said displacement multiplication levers located below said supporting plate means.

3. A ferroelectric transducer as claimed in claim 2 wherein said downward force on said yoke plate is provided by an elongated loop of metallic tape which is clamped to said depressor means at its upper end, anchored to said supporting plate means at its lower end and passes between said confronting faces of said ferroelectric stacks.

4. A ferroelectric transducer as claimed in claim 2, further comprising:
   a tool beam;
   first and second vertically disposed tool beam support plates affixed to said base plate and located adjacent to and spaced from said cross-brace means;
   first and second thin, flexible H-plates, each H-plate being comprised of a frame portion and two finger portions projecting inwardly from said frame portion and thus defining an H-shaped central aperture adapted to receive one end of said tool beam; each of said frame portions being fixedly mounted on adjacent ends of said first and second tool beam support plates; and the ends of said tool beam being mounted, respectively, on the finger portions of one of said H-plates.

5. A ferroelectric transducer as claimed in claim 4 in which said tool beam is coupled to said cross-brace means by at least one strut and thus the motion of said cross-brace means is imparted to said tool beam.

6. A tool tractor, comprising:
   a rigid frame having a base plate, a roof plate, and a plurality of side walls;
   supporting plate means immovably affixed to opposed ones of said side walls and located above and spaced from said base plate;
   a first ferroelectric stack the lower end of which bears upon said supporting plate means;
   a second ferroelectric stack the lower end of which bears upon said supporting plate means;
   a yoke plate overlying said ferroelectric stacks and provided on its lower face with first and second elongated, parallel indentations, each of which indentations overlies one of said ferroelectric stacks;
   a first roller disposed between said yoke plate and the upper end of said first ferroelectric stack and engaged with one of said indentations;
   a second roller disposed between said yoke plate and the upper end of said second ferroelectric stack and engaged with the other one of said indentations;
   depressor means for exerting downward force on the top of said yoke plate and thus pressing said rollers against the respective upper ends of said ferroelectric stacks;
   anchor plate means immovably affixed to opposite ones of said side walls of said rigid frame and thus juxtaposed to said yoke plate in a predetermined juxtaposition when said first and second ferroelectric stacks are unexcited;

flexure plate means affixed adjacent its opposite ends to said yoke plate and to said anchor means respectively, whereby to prevent transverse motion of said yoke plate with respect to said ferroelectric stacks, and at the same time to permit tilting or rocking motion of said yoke plate;

tool displacement signal producing means for producing an electrical displacement signal which represents the momentary displacement of said tool beam from its position of rest; and a feedback control system which compares said electrical displacement signal with an output command signal and produces a correction signal by means of which to hold the actual tool displacement in precise correspondence with the momentary magnitude of a stored electrical signal representing predetermined momentary tool displacement.

7. A tool tractor as claimed in claim 6, further comprising stack exciting means comprised of two oppositely polarized direct current power supplies the predetermined output voltages of which are substantially equal, and a driver amplifier the output voltage of which varies between the positive values of said predetermined output voltages, the instantaneous value of said driver amplifier output voltage being determined by the value of a stored modulating signal representing a predetermined momentary tool displacement pattern.

8. A tool tractor as claimed in claim 7, further comprising a shaft position encoder which is coupled to a workpiece chuck.

* * * * *